United States Patent [19]

Khan

[11] B  3,925,340

[45]  Dec. 9, 1975

[54] PREPARATION OF SOL CHLOROPRENE POLYMERS

[75] Inventor: Ausat Ali Khan, Newark, Del.

[73] Assignee: E. I. Du Pont de Nemours and Company, Wilmington, Del.

[22] Filed: May 8, 1974

[21] Appl. No.: 468,198

[44] Published under the Trial Voluntary Protest Program on January 28, 1975 as document no. B 468,198.

[52] U.S. Cl. ...... 260/92.3; 260/63 BB; 260/80.3 N; 260/80.7; 260/83.1; 260/85.5 XA; 260/85.5 AM; 260/87.1; 260/87.5 R; 260/93.5 R
[51] Int. Cl.²............C08F 113/16; C08F 200/00; C08F 220/42; C08F 214/00
[58] Field of Search.................................. 260/92.3

[56] References Cited
UNITED STATES PATENTS

| 3,147,318 | 9/1964 | Jungk | 260/890 |
|---|---|---|---|
| 3,222,334 | 12/1965 | Demme | 260/84.7 |
| 3,300,433 | 1/1967 | Apotheker | 260/29.7 |
| 3,378,538 | 4/1968 | Sparks | 260/92.3 |
| 3,392,134 | 7/1968 | Apotheker | 260/29.7 |
| 3,686,156 | 8/1972 | Hagman | 260/92.3 |
| 3,775,388 | 11/1973 | Khan | 260/86.3 R |
| 3,775,390 | 11/1973 | Khan | 260/92.3 |

*Primary Examiner*—Joseph L. Schofer
*Assistant Examiner*—Herbert J. Lilling

[57] ABSTRACT

Addition of a defined N-substituted amide in which at least one substituent is a 2-hydroxyethyl or 2-hydroxypropyl-terminated chain of up to about 50 oxyethylene or 2-oxypropylene units to an aqueous alkaline emulsion in which chloroprene or a mixture of chloroprene with another monomer is undergoing polymerization in the presence of an alkyl mercaptan makes it possible to carry out the polymerization to a high degree of conversion, while at the same time avoiding excessive gel formation. This invention makes possible a significant increase in polymer yield without sacrifice of polymer quality or performance.

8 Claims, No Drawings

PREPARATION OF SOL CHLOROPRENE POLYMERS

BACKGROUND OF THE INVENTION

This invention relates to an improvement in the process for the polymerization of chloroprene to mercaptan-modified polymers.

Polymerization of chloroprene in an alkaline aqueous emulsion in the presence of alkyl mercaptans as chain transfer agents is well known. It has been customary in prior practice to stop chloroprene polymerization at a point at which no significant amount of gel was formed because a significant amount of such gel in a chloroprene polymer adversely affects such processing characteristics as polymer smoothness, die definition, and surface appearance of extruded objects. Furthermore, in the preparation of solvent based adhesives, such as rubber cements, it is undesirable to have present an excessive amount of solvent-insoluble material.

The point at which gel formation becomes apparent in a chloroprene polymerization varies with the temperature of polymerization. For example, at 40°C. in a normal emulsion system, the maximum monomer conversion possible has been in the neighborhood of 65 to 70 percent. While gel formation can be delayed by lowering the temperature of polymerization, changes in the crystalline nature of the resulting polymer make the polymer less suitable for certain low temperature applications of the final vulcanizate. At 0° to 10°C., polymerization can be carried to a conversion as high as about 90 percent. These polymers crystallize rapidly and are, therefore, well suited for use in adhesives. Even in these high-conversion polymerizations, it is economically desirable to increase the monomer conversion without producing substantial amounts of polymer insoluble in usual solvents.

There is, therefore, a great need for an economically attractive process for polymerizing chloroprene monomer to a high degree of conversion without sacrificing the desirable properties of the resulting polymer.

SUMMARY OF THE INVENTION

The improvement of the present invention provides for polymerization of chloroprene in an alkaline aqueous emulsion in the presence of a $C_8$–$C_{20}$ alkyl mercaptan and of about 0.05–1 part by weight, per 100 parts of the starting monomer, of an amide represented by the following Formula (1)

(1) 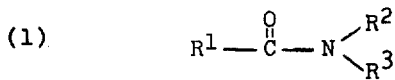

wherein $R^1$ is a $C_7$–$C_{19}$ alkyl or alkenyl;
$R^2$ is represented by Formula (2)

(2) 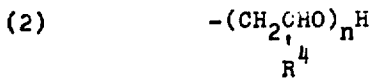

wherein $n$ is a number having an average value of from 1 to about 50, and $R^4$ in each parenthetical unit can be independently of any other such unit either hydrogen or methyl; and $R^3$ is hydrogen, phenyl, benzyl, a $C_1$–$C_5$ alkyl or a radical of Formula (2), as defined above.

If $R^3$ is a radical of Formula (2), the values of the subscript n in $R^2$ and $R^3$ may, but do not have to be the same. However, the sum of the average values of n should not exceed about 50. If $R^1$ is alkenyl, the double bond must be separated from the nitrogen atom by at least one saturated carbon atom.

Definition: For the purpose of the present disclosure, the terms "polymerization of chloroprene" and "chloroprene polymer" include copolymerization of chloroprene with up to equal weight of a copolymerizable monomer and a copolymer of chloroprene with a copolymerizable monomer, respectively. The term "monomer" means chloroprene or a mixture of chloroprene with a copolymerizable monomer.

DETAILED DESCRIPTION OF THE INVENTION

The presence of an amide having Formula (1), above, is critical to the success of the invention. In its presence, the polymerization can be allowed to proceed to a high monomer conversion and still produce a polychloroprene product substantially free of gel polymer.

An essential feature of the amides of Formula (1) is that they contain at least one radical represented by Formula (2), above, terminated by a 2-hydroxyethyl or 2-hydroxypropyl group.

These amides can be prepared by several alternative routes. Amides of Formula (1) wherein $R^3$ is hydrogen are conveniently prepared by reaction of ethylene oxide and/or propylene oxide with a primary amide,

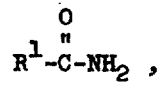

where $R^1$ is as defined above. Because the second amide hydrogen is much less reactive than the first, this method is not practical for making those amides in which both $R^2$ and $R^3$ are represented by the above Formula (2). More general methods of synthesis include, for example, reaction of an acid chloride $R^1$—COCl with 2-aminoethanol, 2,2'-iminodiethanol, 1-amino-2-propanol, or 1,1'-iminodi-2-propanol, (hereafter, for convenience, referred to as alkanolamines), optionally in the presence of a tertiary amine as a proton acceptor; then, if desired, condensing the simple amide so produced with ethylene oxide or propylene oxide. Free acid $R^1$—COOH can be heated with 1,1'-iminodi-2-propanol in an inert atmosphere at about 200°C., while distilling off water. An alternative route involves the aminolysis of a methyl ester $R^1$—COOCH$_3$ with an appropriate alkanolamine at about 100°–200°C, methanol being removed as it is formed. Obviously, any of these alternative methods also can be used to prepare secondary amides in which $R^3$ is phenyl, benzyl, or alkyl. In such a case, an appropriately N-substituted alkanolamine is one of the starting materials, the other being the carboxylic acid $R^1$COOH, its chloride, or methyl ester.

Representative acids $R^1$COOH include octanoic, lauric, palmitic, oleic, myristic, eicosanoic, 2-ethyloctanoic, and palmitoleic. Instead of the free acids, their chlorides or methyl esters can be used, as explained above. The corresponding primary amides will on alkoxylation yield mainly N-monosubstituted amides, rather than disubstituted amides.

Representative secondary amides which can be used as the starting materials for making some N,N-distributed amides are, for example, 2-methylaminoethanol, 2-butylaminoethanol, 2-anilinoethanol, 2-benzylaminoethanol, 2-amylaminoethanol, and the corresponding derivatives of 2-propanol, for example, 1-methylamino-2-propanol, etc.

In alkoxylation reactions, no more than 50 moles of the epoxide should be allowed to react with the amide, whether primary or secondary, because more than this amount would change the hydrophilic nature of the compound.

The reaction of carboxamides with ethylene oxide or propylene oxide is well known in the art. This condensation usually is carried out in the presence of water or an alcohol and is catalyzed by alkalies such as sodium or potassium hydroxides or potassium methoxide. The amount of the catalyst is about 0.005 to 0.05 mole per mole of the starting amide. The reaction temperature is maintained at about 100°–200°C. Certain mono- or polyalkoxylated amides within the scope of Formula (1) are commercially available.

In the preferred amides the radical $R^1$ is a $C_7$ to $C_{17}$ aliphatic hydrocarbon radical which can be linear or branched and may contain one double bond separated from the nitrogen atom by at least one saturated carbon atom. The most readily available starting amides are derived from mixtures of fatty acids such as lauric, palmitic, and oleic, which in turn are derived from animal or vegetable fats and oils, for example, coconut oil and tallow. A frequently occurring radical is $C_{17}H_{33}$ or $CH_3(CH_2)_7CH=CH(CH_2)_7-$, derived from oleic acid. The aliphatic radical $R^1$ may also be obtained, for example, by the OXO process or from a low molecular weight polypropylene or polyisobutylene, the chain thus being branched.

Representative starting amides for reaction with ethylene oxide and/or propylene oxide include, for example, the following:

PRIMARY AMIDES
  lauramide
  palmitamide
  stearamide
  oleamide
  octanamide
  myristamide
  decanamide
  2-ethyloctanamide
  eicosamide
  palmitoleamide SECONDARY AMIDES
  palmitanilide
  N-benzyloleamide
  oleanilide
  N-methyloctadecanamide
  N-butyloctanamide
  octananilide
  N-butyldecanamide
  N-pentyldodecanamide The upper limit of the concentration range of the amide additive of Formula (1) in the polymerization medium is not critical, except that the desired effect is achieved at a concentration of up to about 1 part per 100 parts of monomer, and further increase of concentration is merely wasteful. However, below the lower limit of the concentration range, the effect of the amide may not be significant enough to be of practical interest.

Representative comonomers that can be copolymerized with chloroprene in the process of the present invention include vinyl aromatic compounds, such as styrene, the vinyltoluenes, and vinylnaphthalenes; aliphatic conjugated dienes such as 1,3-butadiene, isoprene, 2,3-dimethyl-1,3-butadiene, and 2,3-dichloro-1,3-butadiene; vinyl ethers, esters and ketones, such as methyl vinyl ether, vinyl acetate, and methyl vinyl ketone; esters, amides and nitriles of acrylic and methacrylic acids, such as ethyl acrylate, methyl methacrylate, methacrylamide, and acrylonitrile.

The polymerization process is carried out in a manner well known in the art. The monomer is emulsified using a conventional carboxylated emulsifying agent. These emulsifying agents include water-soluble soaps of monocarboxylic acids containing 10 to 20 carbon atoms per molecule, which may be saturated or unsaturated fatty acids or rosin acids such as wood rosin or tall oil rosin or hydrogenated, dehydrogentated, or disproportionated rosin acids. The cations may be sodium, potassium, ammonium, or substituted ammonium; typical substituents being lower alkyl and hydroxyalkyl, especially methyl, ethyl,2-hydroxyethyl, and 2-hydroxypropyl. The preferred emulsifying agents are the sodium, potassium, or ammonium salts of wood rosin or disproportionated rosin acids because of the desirable properties they impart to the resulting polymer, such as good tack and processability. About 1–4 parts by weight of emulsifying agent per 100 parts of monomer will normally be used, 3–4 parts being prefered.

An organic surfactant of the sulfate or sulfonate type may also be present in the polymerization system as additional emulsifying agent. Such surfactants are well known and include, among others, alkyl sulfonates, alkyl sulfates, sulfonated and sulfated ethers, sulfonated alkyl esters of long chain fatty acids, sulfonated glycol esters of long chain fatty acids, sulfonated N-alkylamides, alkylaryl sulfonates, and alkyl sulfosuccinates. A good discussion of sulfate and sulfonate surfactants suitable in the polymerization process according to the present invention can be found, for example, in U.S. Pat. No. 2,607,753, to James W. Adams, in column 4, lines 8–64. The preferred emulsifying agent of this type is the condensation product of formaldehyde and a naphthalenesulfonic acid in which the naphthalene nucleus can be substituted with one or more alkyl groups. The colloidal stability of the latex subsequent to the polymerization is increased in the presence of a sulfate or sulfonate type emulsifying agent. The same cations can be associated with sulfate and sulfonate type emulsifying agents as with carboxylic emulsifying agents. The concentration of any sulfate or sulfonate emulsifying agent, if present, is up to about 1 part by weight per 100 parts of monomer, 0.4–0.6 part being preferred.

The pH of the polymerizing emulsion is kept at about 10–13. The monomer concentration, while not critical, normally is about 40–60 percent of the total weight of the emulsion.

The alkyl mercaptans used as chain transfer agents can be branched or linear. Dodecyl mercaptan, which is frequently used, is a mixture of alkyl mercaptans derived from coconut oil and containing from 10 to 18 carbon atoms. Other useful mercaptans include octyl, tert-dodecyl, and tridecyl mercaptans. The proportion of the mercaptan will depend on the type of polymer desired. If a polymer of high Mooney viscosity (that is, relatively high molecular weight) is desired, only a small amount of chain-transfer agent is used. On the other hand, fluid polymers having Brookfield viscosities in the range of 1,000–1,000,000 centipoises at 25°C. can be prepared by using larger amounts of mercaptan. The useful range will be between 0.05 and 2 parts of mercaptan per 100 parts of monomer. While the viscosity of the polymer will largely depend on the amount of mercaptan present in the system, the viscosity of the polymer will vary somewhat from that obtained when amide of Formula (1) is absent. The mechanism of this effect is not clearly understood. The exact amount of each agent to be used can be readily determined by one skilled in the art.

Polymerization is initiated and maintained by the addition of a free-radical polymerization catalyst, such as alkali metal or ammonium persulfates or organic peroxy compounds. The temperature of polymerization can vary within the range from the freezing point of the emulsion (about 0°C.) to about 52°C., preferably from 10° to 48°C. When the desired degree of polymerization is reached, polymerization is stopped by adding a short-stopping agent such as, for example, phenothiazine and 4-tert-butylpyrocatechol. Unchanged monomer can be steam-stripped, for example, as shown in U.S. Pat. No. 2,467,769. The chloroprene polymer can be used as a latex or can be isolated from the latex, for example, by the freeze roll technique such as that disclosed in U.S. Pat. No. 2,187,146 or by any other conventional method.

Other conditions being the same, the presence of the amide of Formula (1) in the polymerization system makes it possible to obtain sol polymer substantially free of a gel component at a monomer conversion higher than was possible in prior art polymerization systems. In general, higher proportions of mercaptan and amide of Formula (1) are required at higher temperatures and for higher conversions. The required amounts of these ingredients can be readily determined by one skilled in the art. Monomer conversions of up to substantially 100 percent are obtainable in the instant process.

The invention now is illustrated by examples of certain representative embodiments thereof where all parts, proportions, and percentages are by weight, unless indicated otherwise.

EXAMPLE 1

An aqueous emulsion of chloroprene is prepared using the following recipe:

|  | Parts |
| --- | --- |
| Chloroprene | 100 |
| Disproportionated rosin | 4 |
| Dodecyl mercaptan (a) | 0.26 |
| Amide of Formula (1) (b) | 0.2 |
| Water | 90.5 |
| Sodium hydroxide | 0.7 |
| Sodium salt of condensate of formaldehyde and a naphthalene-sulfonic acid (c) | 0.7 |
| Sodium sulfite | 0.3 |

(a) Technical dodecyl mercaptan, which is a mixture of mercaptans derived from coconut oil. A typical average composition by weight is:
  3% 1-decanethiol; 61% 1-dodecanethiol;
  23% tetradecanethiol; 11% 1-hexadecanethiol; and
  2% octadecanethiol.
(b) The reference characters in Formula (1) have the following meaning: $R^1 = C_{11}H_{23}$; $R^2 = R^3 =$ 2-hydroxypropyl. This amide can be prepared by reaction in a nitrogen atmosphere of one mole of lauric acid with 1 mole of 1,1′-iminodi-2-propanol at about 200°C. with removal of water as it is formed or of methyl laurate with 1,1′-iminodi-2-propanol at about 160°C. while distilling off methanol.
(c) Commercially available as "Lomar" PW, Nopco Chemical Division, Diamond Shamrock Chemical Co.

Polymerization is carried out at 40°C. to a monomer conversion of 81.8 percent. The catalyst is an aqueous solution of potassium persulfate. Polymerization is stopped by adding an emulsion containing equal parts of phenothiazine and 4-tert-butylpyrocatechol (0.01 to 0.02 part per 100 parts of chloroprene). Unchanged monomer is removed by turbannular steam stripping, substantially as described in U.S. Pat. No. 2,467,769. The emulsion is acidified to a pH of about 5.6 with dilute acetic acid, and the polymer is isolated by freeze rolling as described in U.S. Pat. No. 2,187,146. A sample of the polymer is found to be completely soluble in benzene or toluene. (Solublity is determined by adding a 1–5 gram sample of polymer to 100 ml. of benzene or toluene in a bottle which is stoppered and shaken 4–8 hours at room temperature. The specimen is examined visually for an insoluble portion.) The Mooney viscosity of the isolated polymer is 45 (ML 1+2.5/100°C., ASTM D 1,646–67). The processability (extrusion rate and appearance of a milled sample) and the physical properties, such as modulus, tensile strength, elongation and compression set, of vulcanizates are found to be substantially equivalent to those of a chloroprene polymer made by a similar recipe but in the absence of the amide additive in which the polymerization is stopped at a 65 percent conversion.

EXAMPLE 2

In this Example, the following polymerization recipe is used:

|  | Parts |
| --- | --- |
| Chloroprene | 100 |
| Disproportionated rosin | 4 |
| Dodecyl mercaptan (a) | 0.28 |
| Amide of Formula (1)(as shown) | 0.5 |
| Water | 91.5 |
| Sodium hydroxide | 0.55 |
| Sodium salt of condensate of formaldehyde and a naphthalenesulfonic acid (b) | 0.6 |
| Sodium sulfite | 0.3 |

(a) see footnote (a) to the table in Example 1
(b) see footnote (c) to the table in Example 1

Three different runs are made, each with a different amide additive. In each case, the amide is made by a reaction of a suitable carboxylic acid with ethanolamine and then with ethylene oxide, as follows.

Amide A is the condensation product of ethylene oxide with N-(2-hydroxyethyl)lauramide in a molar ratio of 2:1. This amide is available from Stepan Chemical Co. as "Amidox" L2.

Amide B differs from Amide A only in that the acyl portion is a $C_8$–$C_{18}$ fatty acid mixture derived from coconut oil and is available from Stepan Chemical Co. as "Amidox" C2.

Amide C differs from Amide B only in that the mole ratio of ethylene oxide to the N-(2-hydroxyethyl)amide is 5:1 and is available from Stepan Chemical Co. as "Amidox" C5.

In each run the polymerization is carried out as in Example 1 to a conversion of 83–85 percent. The isolated polymers are soluble in benzene and toluene and have Mooney viscosities of 39–45.

I claim:

1. In the process of polymerizing in the presence of a $C_8$–$C_{20}$ alkyl mercaptan in aqueous emulsion at a pH of about 10–13 chloroprene containing from 0 to about equal weight of a copolymerizable monomer at a temperature from the freezing point of the emulsion to about 52°C., the improvement of having present in the emulsion about 0.05–1 part by weight per 100 parts of the starting monomer, of an amide having the following Formula (1)

$$(1) \quad R^1 - \overset{O}{\underset{\|}{C}} - N \diagup^{R^2}_{R^3}$$

wherein $R^1$ is a $C_7$–$C_{19}$ alkyl or alkenyl, $R^2$ is represented by the following Formula (2):

$$(2) \quad -(CH_2 - \underset{R^4}{CHO})_n H$$

wherein $n$ is a number having an average value of 1 to about 50, and $R^4$ in each parenthetical unit is independently of any other such unit hydrogen or methyl; and $R^3$ is hydrogen, phenyl, benzyl, a $C_1$–$C_5$ alkyl, or a radical of the above Formula (2);

with the provisos that when $R^3$ has the above Formula (2), the sum of the average values of $n$ in $R^2$ and $R^3$ is at most about 50; and when $R^1$ is alkenyl, the double bond is separated from the nitrogen atom by at least one saturated carbon atom.

2. The improvement of claim 1 wherein the polymerization temperature is about 10°–48°C.

3. The improvement of claim 1 wherein $R^1$ in Formula (2) is an aliphatic hydrocarbon radical having 7–17 carbon atoms.

4. The improvement of claim 1 wherein the emulsifying agent is sodium, potassium, or ammonium salt of rosin or of disproportionated rosin; the concentration of the emulsifyiing agent being about 1–4 parts per 100 parts by weight of monomer.

5. The improvement of claim 1 wherein there is also present in the emulsion up to one part by weight of a sulfate or sulfonate surfactant.

6. The improvement of claim 1 wherein the alkyl mercaptan is dodecyl mercaptan.

7. The improvement of claim 1 wherein the amide of Formula (1) is a lauramide derivative, $R^1$ being $C_{11}H_{23}$, and each of $R^2$ and $R^3$ being 2-hydroxypropyl.

8. The improvement of claim 1 wherein the amide of Formula (1) is a lauramide derivative, $R^1$ being $C_{11}H_{23}$, and each of $R^2$ and $R^3$ being 2-hydroxyethyl.

* * * * *